US012232677B2

(12) United States Patent
Hofmann et al.

(10) Patent No.: US 12,232,677 B2
(45) Date of Patent: Feb. 25, 2025

(54) FILTER CLEANING ASSEMBLY FOR A DISHWASHER APPLIANCE

(71) Applicant: Haier US Appliance Solutions, Inc., Wilmington, DE (US)

(72) Inventors: Adam Christopher Hofmann, Louisville, KY (US); Kyle Edward Durham, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 210 days.

(21) Appl. No.: 17/942,485

(22) Filed: Sep. 12, 2022

(65) Prior Publication Data
US 2024/0081605 A1    Mar. 14, 2024

(51) Int. Cl.
| | | |
|---|---|---|
| *A47L 15/42* | (2006.01) | |
| *B01D 29/085* | (2006.01) | |
| *B01D 29/33* | (2006.01) | |
| *B01D 29/50* | (2006.01) | |
| *B01D 29/64* | (2006.01) | |

(52) U.S. Cl.
CPC ....... *A47L 15/4208* (2013.01); *A47L 15/4206* (2013.01); *A47L 15/4225* (2013.01); *B01D 29/085* (2013.01); *B01D 29/33* (2013.01); *B01D 29/50* (2013.01); *B01D 29/6438* (2013.01); *B01D 2201/02* (2013.01); *B01D 2201/084* (2013.01)

(58) Field of Classification Search
CPC ............. A47L 15/4208; A47L 15/4206; A47L 15/4225; B01D 29/085; B01D 29/33; B01D 29/50; B01D 29/6438; B01D 2201/02; B01D 2201/084

USPC ........................................................ 134/110
See application file for complete search history.

(56) References Cited

U.S. PATENT DOCUMENTS

| 8,707,973 B2 | 4/2014 | Yoon et al. |
| 10,512,386 B2 | 12/2019 | Boyer |

(Continued)

FOREIGN PATENT DOCUMENTS

| CN | 106108826 A | | 11/2016 |
| CN | 113520266 A | * | 10/2021 |

(Continued)

OTHER PUBLICATIONS

CN113520266A—machine translation (Year: 2021).*

*Primary Examiner* — Tinsae B Ayalew
(74) *Attorney, Agent, or Firm* — Dority & Manning, P.A.

(57) ABSTRACT

A dishwasher appliance includes a wash tub, a sump for collecting wash fluid, and a cylindrical filter screen positioned within the sump. A wash pump assembly includes a wash pump impeller and a supply conduit, the wash pump impeller being configured for urging the wash fluid through the cylindrical filter screen and into the supply conduit. A filter cleaning assembly includes a filter cleaning manifold positioned proximate the cylindrical filter screen and in fluid communication with the supply conduit and one or more vertical spray arms extending along the vertical direction adjacent the cylindrical filter screen, the one or more vertical spray arms defining a plurality of outer ports in fluid communication with the filter cleaning manifold, the plurality of outer ports being positioned and oriented for directing the wash fluid at least partially along a circumferential direction about the cylindrical filter screen.

20 Claims, 8 Drawing Sheets

(56) References Cited

U.S. PATENT DOCUMENTS

| | | | |
|---|---|---|---|
| 10,791,905 B2 | 10/2020 | Dries et al. | |
| 2006/0237050 A1* | 10/2006 | Weaver | A47L 15/4208 |
| | | | 134/10 |
| 2020/0214529 A1 | 7/2020 | Heinle et al. | |
| 2020/0253455 A1* | 8/2020 | Dries | A47L 15/4208 |

FOREIGN PATENT DOCUMENTS

| | | |
|---|---|---|
| DE | 3723721 A1 | 5/1988 |
| DE | 10244243 A1 | 3/2004 |
| EP | 1919346 B1 | 10/2010 |
| EP | 2901908 A1 | 8/2015 |

* cited by examiner

FILTER CLEANING ASSEMBLY FOR A DISHWASHER APPLIANCE

FIELD OF THE INVENTION

The present disclosure relates generally to dishwasher appliances, and more particularly to features for cleaning filters within dishwasher appliances.

BACKGROUND OF THE INVENTION

Dishwasher appliances generally include a tub that defines a wash chamber. Rack assemblies can be mounted within the wash chamber of the tub for receipt of articles for washing. Wash fluid (e.g., various combinations of water and detergent along with optional additives) may be introduced into the tub where it collects in a sump space at the bottom of the wash chamber. During wash and rinse cycles, a pump may be used to circulate wash fluid to spray assemblies within the wash chamber that can apply or direct wash fluid towards articles disposed within the rack assemblies in order to clean such articles. During a drain cycle, a pump may periodically discharge soiled wash fluid that collects in the sump space and the process may be repeated.

Conventional dishwasher appliances use a filter to remove food particles, soil, and other contaminants from the wash fluid before recirculating the wash fluid through the pump and to the spray assemblies. The collected soil must be periodically removed from the filter to decrease flow resistance and improve the cleaning performance of the dishwasher appliance. Therefore, certain conventional dishwasher appliances include one or more filter cleaning ports defined on a bottom surface of the lower spray arm. The filter cleaning ports are configured for directing a stream of wash fluid onto the filter to dislodge food particles and soil to allow them to fall to the bottom of the sump for discharge during a drain cycle. However, in order to support operation of both the lower spray arm cleaning ports and the filter cleaning ports, a large pump is needed to generate sufficient wash fluid pressure. In addition, the filter cleaning ports are positioned far away from the filter and often cannot directly spray all surfaces of the filter, resulting in less effective cleaning.

Accordingly, a dishwasher appliance that utilizes an improved filter cleaning assembly would be useful. More specifically, a filter cleaning assembly that effectively cleans a filter of the dishwasher appliance without requiring a larger pump or complicated fluid supply systems would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a dishwasher appliance is provided defining a vertical direction is provided. The dishwasher appliance includes a wash tub that defines a wash chamber, a sump for collecting wash fluid, a cylindrical filter screen positioned within the sump, the cylindrical filter screen defining a filtered region and an unfiltered region, a wash pump assembly comprising a wash pump impeller and a supply conduit, the wash pump impeller being configured for urging the wash fluid through the cylindrical filter screen and into the supply conduit, and a filter cleaning assembly. The filter cleaning assembly includes a filter cleaning manifold positioned proximate the cylindrical filter screen and in fluid communication with the supply conduit and one or more vertical spray arms extending along the vertical direction adjacent the cylindrical filter screen, the one or more vertical spray arms defining a plurality of outer ports in fluid communication with the filter cleaning manifold, the plurality of outer ports being positioned and oriented for directing the wash fluid at least partially along a circumferential direction about the cylindrical filter screen.

In another exemplary embodiment, a filter cleaning assembly for a dishwasher appliance is provided. The dishwasher appliance includes a cylindrical filter screen positioned within a sump and a wash pump assembly for urging wash fluid through a supply conduit. The filter cleaning assembly includes a filter cleaning manifold positioned proximate the cylindrical filter screen and in fluid communication with the supply conduit and one or more vertical spray arms extending along a vertical direction adjacent the cylindrical filter screen, the one or more vertical spray arms defining a plurality of outer ports in fluid communication with the filter cleaning manifold, the plurality of outer ports being positioned and oriented for directing the wash fluid at least partially along a circumferential direction about the cylindrical filter screen.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
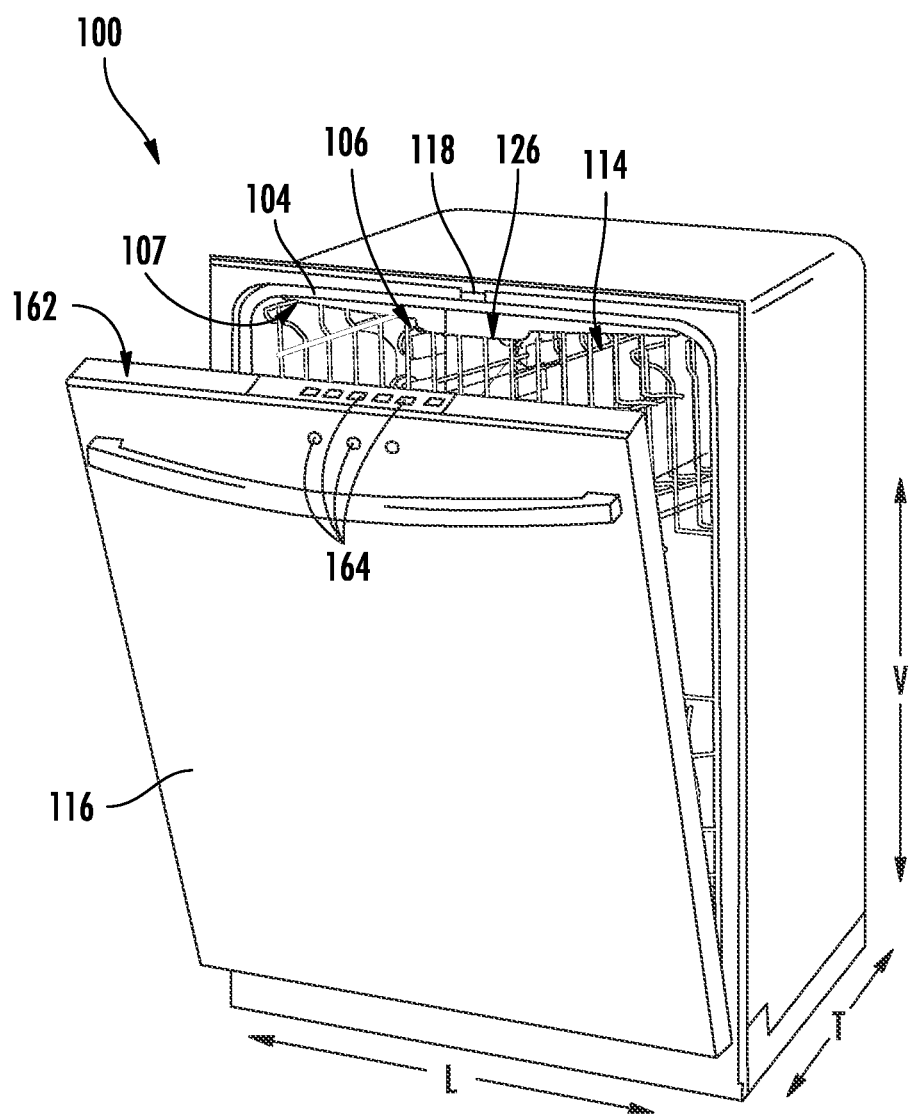
FIG. 1 provides a perspective view of an exemplary embodiment of a dishwashing appliance of the present disclosure with a door in a partially open position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
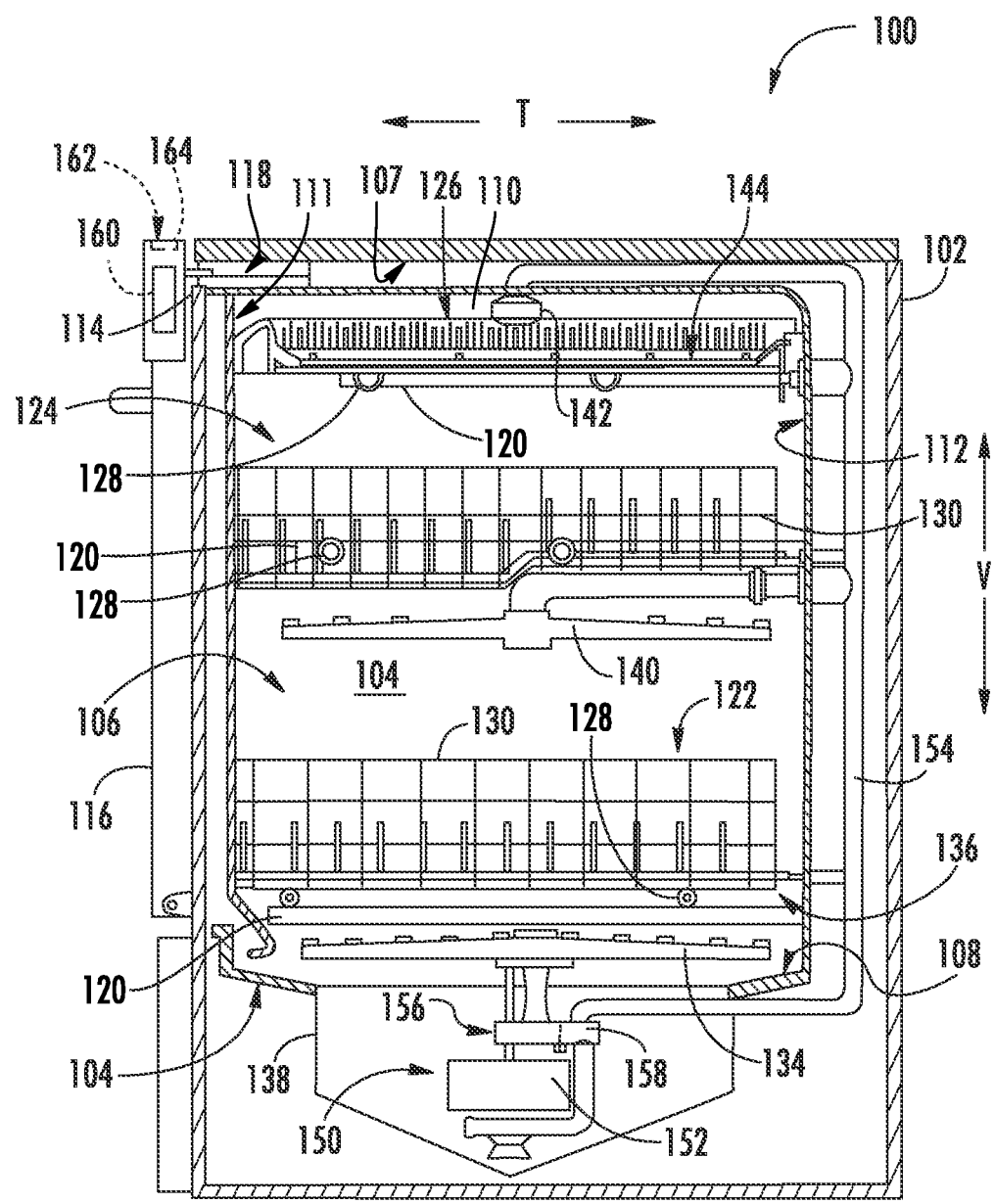
FIG. 2 provides a side, cross sectional view of the exemplary dishwashing appliance of FIG. 1.
Figure 3:
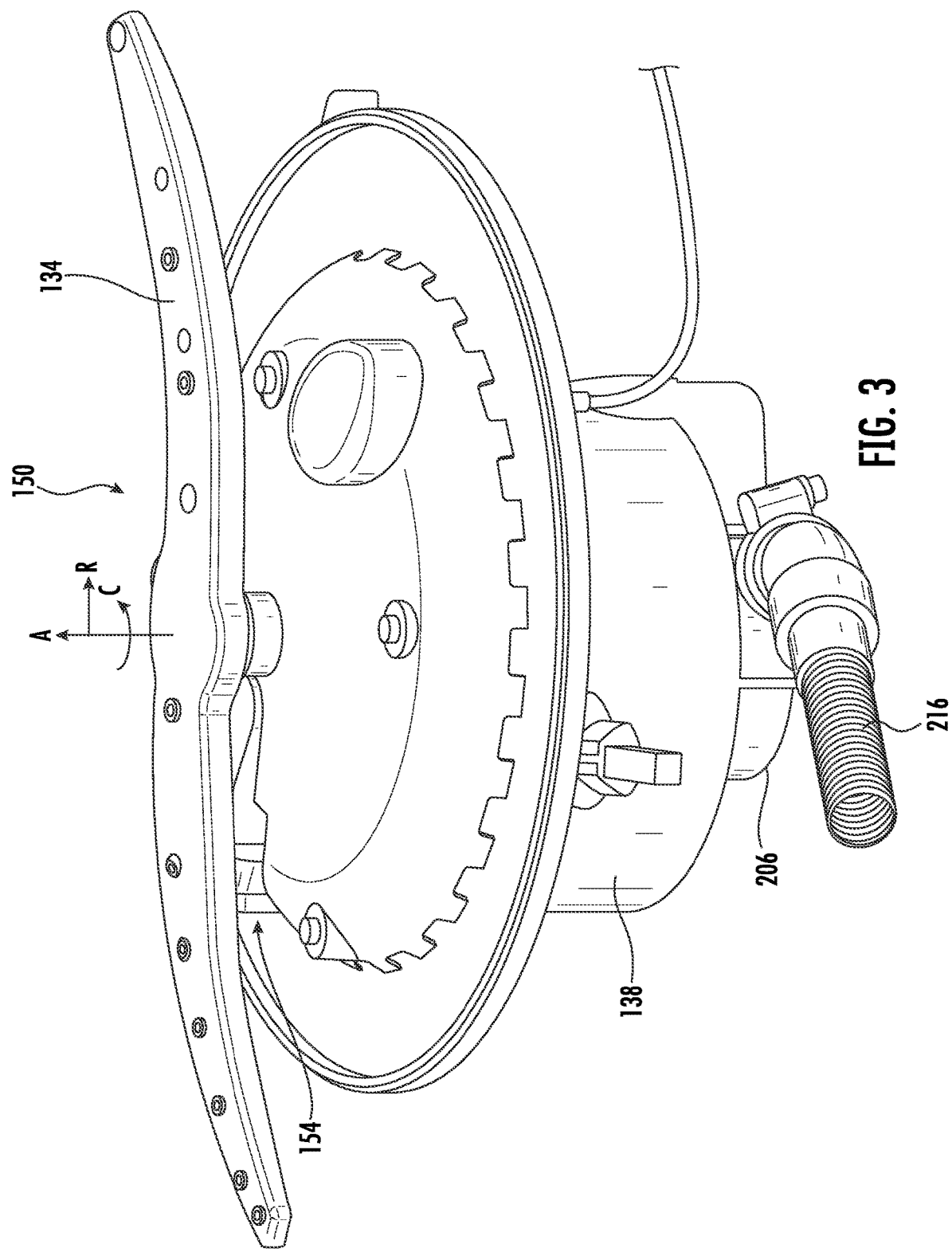
FIG. 3 provides a perspective view of certain components of a fluid circulation assembly according to an example embodiment of the present subject matter.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 (FIG. 2) having a tub 104 therein that defines a wash chamber 106. As shown in FIG. 2, tub 104 extends between a top 107 and a bottom 108 along a vertical direction V, between a pair of side walls 110 along a lateral direction L, and between a front side 111 and a rear side 112 along a transverse direction T. Each of the vertical direction V, lateral direction L, and transverse direction T are mutually perpendicular to one another.

The tub 104 includes a front opening 114 and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. According to exemplary embodiments, dishwasher 100 further includes a door closure mechanism or assembly 118 that is used to lock and unlock door 116 for accessing and sealing wash chamber 106.

As best illustrated in FIG. 2, tub side walls 110 accommodate a plurality of rack assemblies. More specifically, guide rails 120 may be mounted to side walls 110 for supporting a lower rack assembly 122, a middle rack assembly 124, and an upper rack assembly 126. As illustrated, upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although a guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles, e.g., during a cleaning or rinsing cycle. According to another exemplary embodiment, a silverware basket (not shown) may be removably attached to a rack assembly, e.g., lower rack assembly 122, for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 may generally be configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging and/or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in the tub 104. More specifically, fluid circulation assembly 150 includes a pump 152 for circulating water and wash fluid (e.g., detergent, water, and/or rinse aid) in the tub 104. Pump 152 may be located within sump 138 or within a machinery compartment located below sump 138 of tub 104, as generally recognized in the art. Fluid circulation assembly 150 may include one or more fluid conduits or circulation piping for directing water and/or wash fluid from pump 152 to the various spray assemblies and manifolds. For example, as illustrated in FIG. 2, a primary supply conduit 154 may extend from pump 152, along rear 112 of tub 104 along the vertical direction V to supply wash fluid throughout wash chamber 106.

As illustrated, primary supply conduit 154 is used to supply wash fluid to one or more spray assemblies, e.g., to mid-level spray arm assembly 140 and upper spray assembly 142. However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only, and are not limitations of the present subject matter.

In operation, pump 152 draws wash fluid in from sump 138 and pumps it to a diverter assembly 156, e.g., which is positioned within sump 138 of dishwasher appliance. Diverter assembly 156 may include a diverter disk (not shown) disposed within a diverter chamber 158 for selectively distributing the wash fluid to the spray arm assemblies 134, 140, 142 and/or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter assembly 156 is configured for selectively distributing the flow of wash fluid from pump 152 to various fluid supply conduits, only some of which are illustrated in FIG. 2 for clarity. More specifically, diverter assembly 156 may include four outlet ports (not shown) for supplying wash fluid to a first conduit for rotating lower spray arm assembly 134, a second conduit for rotating mid-level spray arm assembly 140, a third conduit for spraying upper spray assembly 142, and a fourth conduit for supplying a filter cleaning assembly 250, which will be described in more detail below according to an exemplary embodiment.

The dishwasher 100 is further equipped with a controller 160 to regulate operation of the dishwasher 100. The controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 160 may be positioned in a variety of locations throughout dishwasher 100. In the illustrated embodiment, the controller 160 may be located within a control panel area 162 of door 116 as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of the dishwasher 100. In one embodiment, the user interface 164 may represent a general purpose I/O ("GPIO") device or functional block. In one embodiment, the user interface 164 may include input components, such as one or more of a variety of electrical, mechanical or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter.

Referring now generally to FIGS. 3 through 8, fluid circulation assembly 150 will be described according to an example embodiment of the present subject matter. Fluid circulation assembly 150 may include a drive motor 170 that may be disposed within sump 138 of tub 104 and may be configured to rotate multiple components of dishwasher 100. As illustrated, drive motor 170 may be, for example, a brushless DC motor having a stator 172, a rotor 174, and a drive shaft 176 attached to rotor 174. A controller or control board (not shown) may control the speed of motor 170 and rotation of drive shaft 176 by selectively applying electric current to stator 172 to cause rotor 174 and drive shaft 176 to rotate. Although drive motor 170 is illustrated herein as a brushless DC motor, it should be appreciated that any suitable motor may be used while remaining within the scope of the present subject matter. For example, according to alternative embodiments, drive motor 170 may instead be a synchronous permanent magnet motor.

According to an example embodiment, drive motor 170 may be a variable speed motor. In this regard, drive motor 170 may be operated at various speeds depending on the current operating cycle of the dishwasher. For example, according to an exemplary embodiment, drive motor 170 may be configured to operate at any speed between a minimum speed, e.g., 1500 revolutions per minute (RPM), to a maximum rated speed, e.g., 4500 RPM. In this manner, use of a variable speed drive motor 170 enables efficient operation of dishwasher 100 in any operating mode. Thus, for example, the drain cycle may require a lower rotational speed than a wash cycle and/or rinse cycle. A variable speed drive motor 170 allows impeller rotation at the desired speeds while minimizing energy usage and unnecessary noise when drive motor 170 does not need to operate at full speed.

According to an exemplary embodiment, drive motor 170 and all its components may be potted. In this manner, drive motor 170 may be shock-resistant, submersible, and generally more reliable. Notably, because drive motor 170 is mounted inside wash chamber 106 and is completely submersible, no seals are required and the likelihood of leaks is reduced. In addition, because drive motor 170 is mounted in the normally unused space between lower spray arm assembly 134 and a bottom wall of sump 138, instead of beneath the sump 138, this design is inherently more compact than conventional designs.

Figure 4:
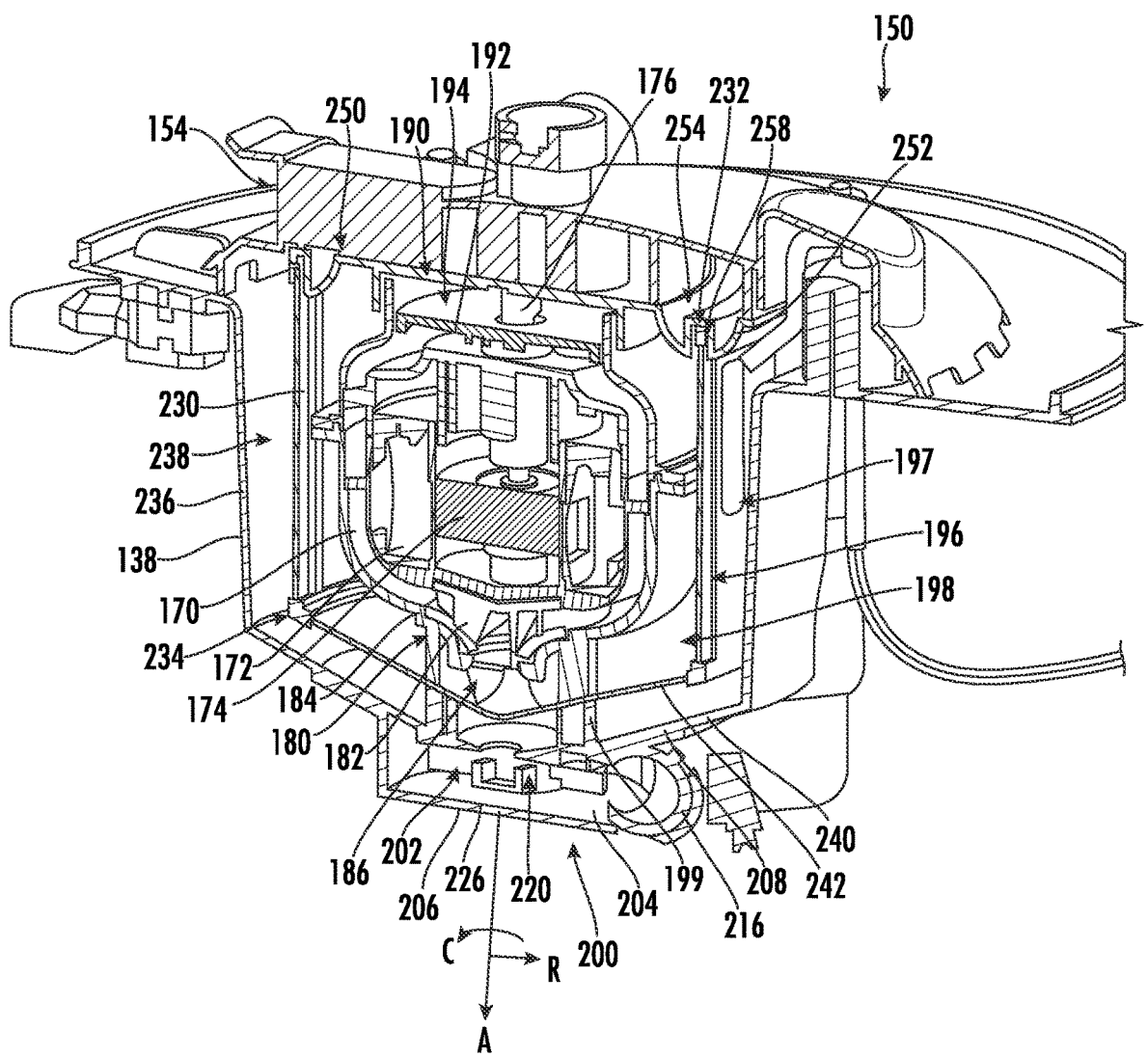
FIG. 4 provides a perspective, cross sectional view of the exemplary fluid circulation assembly of FIG. 3 according to an example embodiment of the present subject matter.
Figure 5:
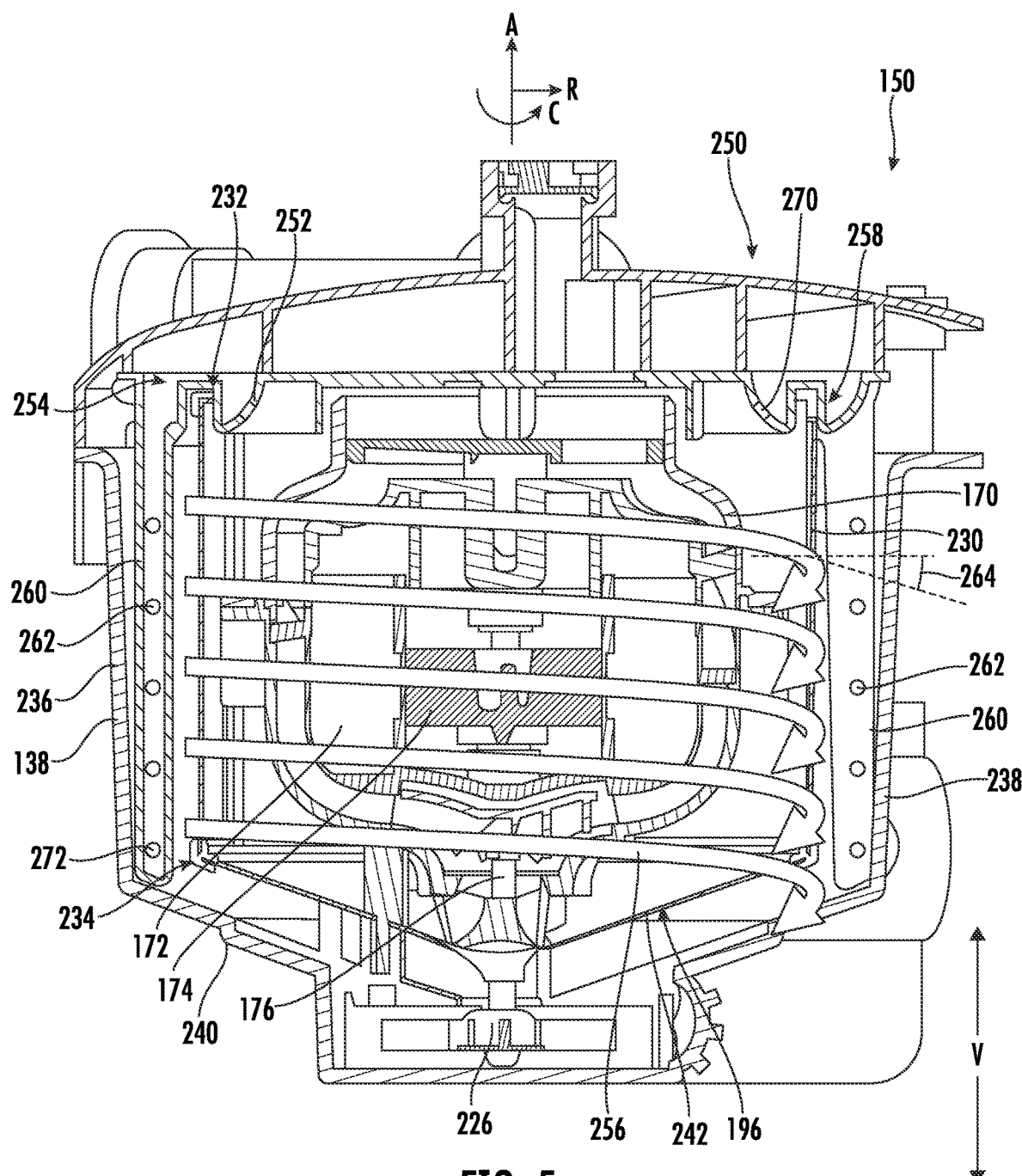
FIG. 5 provides a side, cross sectional view of the exemplary fluid circulation assembly of FIG. 3, emphasizing the operation of outer spray ports according to an example embodiment of the present subject matter.

According to an exemplary embodiment, fluid circulation assembly 150 may be vertically mounted within sump 138 of wash chamber 106. More particularly, drive motor 170 of fluid circulation assembly 150 may be mounted such that drive shaft 176 is oriented along vertical direction V of dishwasher 100. More particularly, drive shaft 176 may define an axial direction A, a radial direction R, and a circumferential direction C (FIG. 3), with the axial direction A being parallel to the vertical direction V of the dishwasher 100. As illustrated in FIG. 4, drive shaft 176 is rotatably supported by upper and lower bearings and extends out of a bottom of drive motor 170 toward a bottom of sump 138.

Referring now to FIGS. 4 through 8, drive shaft 176 is configured for driving a circulation or wash pump assembly 180. Wash pump assembly 180 may generally be configured for circulating wash fluid within wash chamber 106 during wash and/or rinse cycles. More specifically, wash pump assembly 180 may include a wash pump impeller 182 disposed on drive shaft 176 within a pump housing 184. Pump housing 184 defines a pump intake 186 for drawing wash fluid into wash pump impeller 182. According to the illustrated embodiment, pump intake 186 is facing downward along the vertical direction V and is located very near the bottom of sump 138. In this manner, the amount of water required to prime and operate wash pump assembly 180 is minimized. This is particularly advantageous when running low water cycles for the purpose of water and energy savings.

As shown in FIG. 4, pump housing 184 is in fluid communication with a supply conduit 188 through which pressurized wash fluid may be recirculated through fluid circulation assembly 150. More specifically, according to the illustrated embodiment, wash pump impeller 182 draws wash fluid in from sump 138 and pumps it through supply conduit 188 to a diverter assembly 190 (such as diverter assembly 156) which generally distributes the flow of wash fluid as desired within dishwasher 100.

As shown in FIG. 4, diverter assembly 190 may include a diverter disc 192 disposed within a diverter chamber 194 (such as diverter chamber 158). Diverter chamber 194 is fluidly coupled to supply conduit 188, such that rotating diverter disc 192 may selectively distribute the flow of wash fluid to the spray arm assemblies 134, 140, 142, filter cleaning assembly 250, or any other fluid conduit coupled to diverter chamber 194. More particularly, diverter disc 192 may be rotatably mounted about the vertical direction V. Diverter disc 192 may have a plurality of apertures that are configured to align with a one or more outlet ports at the top of diverter chamber 194. In this manner, diverter disc 192 may be selectively rotated to provide wash fluid to spray arm assemblies 134, 140, 142 or filter cleaning assembly 250.

As illustrated in FIGS. 4 through 8, fluid circulation assembly 150 further includes a filter screen or filter 196. In general, filter 196 may define an unfiltered region 197 and a filtered region 198 within sump 138. During a wash or rinse cycle, wash fluid sprayed on dishes or other articles within wash chamber 106 falls into the unfiltered region 197. Wash fluid passes through filter 196 which removes food particles, resulting in relatively clean wash fluid within the filtered region 198. As used herein, "food particles" refers to food soil, particles, sediment, or other contaminants in the wash fluid which are not intended to travel through filter 196. Thus, a food particle seal may allow water or other wash fluids to pass from the unfiltered region 197 to the filtered region 198 while preventing food particles entrained within that wash fluid from passing along with the wash fluid.

As illustrated, filter 196 is a cylindrical and conical fine mesh filter constructed from a perforated stainless steel plate. Filter 196 may include a plurality of perforated holes, e.g., approximately $15/1000$ of an inch in diameter, such that wash fluid may pass through filter 196, but food particles entrained in the wash fluid do not pass through filter 196. However, according to alternative embodiments, filter 196 may be any structure suitable for filtering food particles from wash fluid passing through filter 196. For example, filter 196 may be constructed from any suitably rigid material, may be formed into any suitable shape, and may include apertures of any suitable size for capturing particulates.

According to the illustrated exemplary embodiment, filter 196 defines an aperture through which drive shaft 176 extends. Wash pump impeller 182 is coupled to drive shaft 176 above filter 196 and a drain pump assembly (e.g., as described below) is coupled to drive shaft 176 below filter 196 along the vertical direction V. Fluid circulation assembly 150 may further include an inlet guide assembly 199 which is configured for accurately locating and securing filter 196 while allowing drive shaft 176 to pass through aperture and minimizing leaks between the filtered and unfiltered regions 197, 198 of sump 138. More specifically, as best illustrated in FIG. 4, drive shaft 176 passes through a clearance bore in inlet guide assembly 199 and through filter 196 between unfiltered region 197 and filtered region 198 of sump 138. Because the clearance bore has a diameter that is larger than the diameter of drive shaft 176, inlet guide assembly 199 may further include a washer disposed within a chamber, e.g., in order to accommodate minor drive shaft wobble or misalignment while retaining a particle tight seal.

Referring still to FIGS. 4 through 7, a drain pump assembly 200 according to an exemplary embodiment of the present subject matter will be described. Drain pump assembly 200 may generally be configured for periodically discharging soiled wash fluid from dishwasher 100. Although illustrated and described as part of fluid circulation assembly 150, it should be appreciated that aspects of drain pump assembly 200 may be used in any impeller assembly in any application where it is desirable to selectively pump a fluid. In this regard, drain pump assembly 200 is only one exemplary configuration used for the purpose of explaining aspects of the present subject matter and is not intended to limit the scope of the invention in any manner.

Drain pump assembly 200 may include a drain pump impeller 202 coupled to a bottom portion of drive shaft 176 and positioned within a drain volute 204 below filter 196. More specifically, drain volute 204 is defined by a drain basin 206 of sump 144 and a drain cover 208 that positioned over drain basin 206 and forms a fluid tight seal with drain basin 206, e.g., by using an O-ring or any other suitable sealing mechanism. According to the illustrated embodiment, the bottom of sump 138 and drain cover 208 define a seamless transition and are cone-shaped to help funnel food particles toward drain volute 202. For example, as illustrated, sump 138 and drain cover 208 define a frustum of a cone above drain basin 206.

As illustrated, drain pump assembly 200 further includes a discharge conduit 216 (FIG. 3) that extends from drain basin 206 and is in fluid communication with drain volute 204. Drain cover 208 defines a drain inlet 220 through which wash fluid may pass into drain volute 204. As illustrated, drain inlet 220 is a circular aperture in the center of drain cover 208, but other sizes and geometries may be used according to alternative embodiments. As illustrated drive shaft 176 passes through drain inlet 220 into drain volute 204 where it is coupled to drain pump impeller 202. During a drain cycle, drain pump impeller 202 draws soiled wash fluid through drain inlet 220 into drain volute 204 and discharges it through discharge conduit 216.

Notably, drain pump impeller 202 is coupled to the bottom portion of drive shaft 176 using a one-way clutch 226. In this regard, during a wash/rinse cycle, drive motor 170 rotates in one direction, pumping filtered wash fluid using wash pump impeller 182. However, one-way clutch 226 is disengaged, so drain pump impeller 202 does not rotate at the same speed. Instead, drain pump impeller 202 may rotate at a decreased speed, e.g., due to some friction between one-way clutch 226 and drive shaft 176. According to alternative embodiments, drain pump impeller 202 may remain stationary during the wash cycle or may rotate at the same speed as wash pump impeller 182. In both cases, soil and food particles will have a tendency to collect within drain volute 204, as described herein. By contrast, during a drain cycle, drive motor 170 rotates in the opposite direction, thereby engaging one-way clutch 226 and causing drain pump impeller 202 to rotate and discharge wash fluid.

As illustrated, drain inlet 220 is positioned at a center of drain cover 208 and is sized such that wash fluid and large food particles may pass into drain volute 204. However, drain cover 208 also acts as a barrier to prevent soil that collects around a perimeter of drain volute 204 from escaping drain volute 204, e.g., along the vertical direction V. In this manner, as drain pump impeller 202 rotates, soil and food particles are urged radially outward within drain basin 206 where they are trapped and collect until a drain cycle is initiated. When drive shaft 176 is rotated in the drain direction, wash fluid and soils collected in drain volute 204 are quickly and efficiently expelled through discharge conduit 216.

Drain pump volute 202 and discharge conduit 216 are both positioned at the very bottom of sump 138, at the lowest portion of fluid circulation assembly 150, providing several operational advantages. Specifically, heavier soil tends to fall toward drain volute 204 where wash fluid and food particles are collected. During a drain cycle, drain pump impeller 202 is rotated and soiled wash fluid is discharged from dishwasher 100 through a discharge conduit 216 such that complete draining of soiled wash fluid may be achieved. After some or all of the soiled wash fluid is discharged, fresh water and/or wash additives may be added and the wash or rinse cycle may be repeated.

It should be appreciated that drain pump assembly 200 is used only for the purpose of explaining aspects of the present subject matter. Modifications and variations may be made to drain pump assembly 200 while remaining within the scope of the present subject matter. For example, the number, size, spacing, and configuration of vanes of drain pump impeller 202 may be adjusted while remaining within the scope of the present subject matter.

Drain pump assembly 200 as described above enables both wash pump impeller 182 and drain pump impeller 202 of fluid circulation system 150 to be placed on a single drive shaft 176. In this manner, a single, reversible drive motor 170 can rotate drive shaft 176 in a first direction for wash/rinse cycles and in the opposite direction for drain cycles. More specifically, according to the illustrated embodiment, drive motor 170 and wash pump assembly 180 are positioned within filtered region 198, while drain pump assembly 200 is positioned within unfiltered region 197. Furthermore, because drain pump impeller 202 rotates relatively slowly during the wash cycle, drain pump impeller 202 draws food particles and soil into drain volute 204 and urges them radially outward to trap them in drain volute 204. In this manner, wash fluid circulated within wash chamber 106 has a lower soil content and can facilitate more effective cleaning of articles placing in the dishwashing racks. In addition, the soil is trapped or contained proximate discharge conduit 216 for effective discharge when drain pump impeller 202 is rotated in the drain direction.

Referring to FIGS. 4 through 7, filter screen 196 will be described in more detail according to example embodiments of the present subject matter. In this regard, as illustrated, filter screen 196 may generally include a cylindrical filter screen 230 that surrounds wash pump assembly 180, e.g., extending about the circumferential direction C and being substantially concentric with drive shaft 176. According to the illustrated embodiment, cylindrical filter screen 230 may generally extend along the vertical direction V between a top end 232 positioned proximate a top of sump 138 and a bottom end 234 positioned proximate a bottom of sump 138.

In addition, according to example embodiments, sump 138 may be defined at least in part by a cylindrical sump wall 236 that extends from a bottom of wash tub 104 downward along the vertical direction V toward drain basin 206. As shown, cylindrical filter screen 230 may be concentric with cylindrical sump wall 236 and may define an annular plenum 238 therebetween. In general, this annular plenum 238 may correspond with unfiltered region 197 of sump 138, while the interior of cylindrical filter screen 230 may correspond to filtered region 198.

In addition, sump 138 may be defined at least in part by a conical sump wall 240 that extends from cylindrical sump wall 236 inward along the radial direction toward drain volute 204. In order to prevent debris and soil from unfiltered region 197 from passing into filtered region 198 from within this lower portion of sump 138, filter screen 196 may further include a conical filter screen 242 positioned at bottom end 234 of the cylindrical filter screen 230. In general, conical filter screen 242 may form a continuous filter (e.g., filter screen 196) extending from cylindrical filter screen 230 and may be substantially parallel to conical sump wall 240. In this regard, annular plenum 238 may extend from wash tub 104 all the way into drain basin 206 and drain volute 204, while maintaining a substantial debris shield between unfiltered region 197 and filtered region 198.

Referring now generally to FIGS. 3 through 8, a filter cleaning assembly 250 according to an exemplary embodiment of the present subject matter will be described. Filter cleaning assembly 250 may generally be configured for intermittently or continuously cleaning or dislodging food particles or soil from a filter screen of a dishwasher appliance, such as filter screen 196 (including cylindrical filter screen 230 and conical filter screen 242). Although illustrated and described as part of fluid circulation assembly 150, it should be appreciated that aspects of filter cleaning assembly 250 may be used in any appliance where it is desirable to filter a fluid and periodically clean the filter. In this regard, filter cleaning assembly 250 is only one exemplary configuration used for the purpose of explaining aspects of the present subject matter and is not intended to limit the scope of the invention in any manner.

According to the illustrated embodiment, filter cleaning assembly 250 includes a filter cleaning manifold 252 that is positioned proximate filter screen 196, e.g., on top of cylindrical filter screen 230 along the vertical direction V. Filter cleaning manifold 252 defines a wash fluid plenum 254 that is in fluid communication with supply conduit 188 through diverter chamber 194. In addition, filter cleaning assembly 250 includes a plurality of cleaning ports (described below) that are in fluid communication with wash fluid plenum 254. In this manner, filter cleaning manifold 252 is generally configured for receiving a flow of wash fluid (identified herein generally by reference numeral 256) when diverter disc 192 is positioned such that wash fluid plenum 254 is in fluid communication with diverter chamber 194.

As shown, filter cleaning manifold 252 is a circular manifold positioned all the way around the top of cylindrical filter screen 196. In this manner, wash fluid plenum 254 is generally an annular chamber that distributes the flow of wash fluid around an entire circumference of filter screen 196. More specifically, according to an exemplary embodiment, filter cleaning manifold 252 is positioned above the filter screen 196 along the vertical direction V. In addition, according to one embodiment, filter cleaning manifold 252 defines a circular filter receiving slot 258 having a diameter substantially equivalent to the diameter of filter screen 196. As shown, filter screen 196 is received within slot 258 to secure filter cleaning manifold 252 to filter screen 196.

According to the illustrated embodiment, filter screen 196 is received within slot 258 defined by filter cleaning manifold 252. Thus, filter screen 196 may generally be compression fit within slot 258. However, it should be appreciated that filter screen 196 may be mounted to the filter cleaning manifold 252 using one or more mechanical fasteners, such as screws, bolts, rivets, etc. Alternatively, glue, welding, snap-fit mechanisms, interference-fit mechanisms, or any suitable combination thereof may secure filter screen 196 to filter cleaning manifold 252.

Referring still to FIGS. 4 through 8, filter cleaning assembly 250 may generally include one or more vertical spray arms 260 extending along the vertical direction V adjacent cylindrical filter screen 230. In this regard, according to example embodiments, vertical spray arms 260 may be fluidly coupled to filter cleaning manifold 252 (e.g., for receiving flow of wash fluid 256 from wash fluid plenum 254). As illustrated, vertical spray arms 260 extend substantially along the vertical direction V from top end 232 of cylindrical filter screen 230 to bottom end 234 of cylindrical filter screen 230.

As shown, vertical spray arms 260 may generally define a plurality of outer ports 262 in fluid communication with filter cleaning manifold 252 for discharging the flow of wash fluid 256. In this regard, outer ports 262 are positioned and oriented for directing the wash fluid 256 at least partially along the circumferential direction C about cylindrical filter screen 230. According to the illustrated embodiment, each vertical spray arm 260 includes four outer ports 262 spaced equidistantly along vertical spray arm 260 and being similarly sized and angled. However, it should be appreciated that the size, ejection angle, position, and orientation of outer ports 262 may vary while remaining within the scope of the present subject matter.

It should be appreciated that outer ports 262 may be positioned an orientation for generating any suitable fluid pattern of wash fluid 256. For example, outer ports 262 defined and oriented at an angle 264 (see, e.g., FIG. 5) measured relative to the circumferential direction C to create a helical flow around cylindrical filter screen 230. In this regard, outer ports 262 may be oriented in the same circumferential direction C (e.g., all clockwise-oriented) and slightly downward to create a vortex-like crossflow along the outer surface of cylindrical filter screen 230.

According to the illustrated embodiment, filter cleaning assembly 250 includes two vertical spray arms 260 that are spaced apart along the circumferential direction C within sump 138 (or within annular plenum 238). However, it should be appreciated that one or more than two vertical spray arms 260 may be used according to alternative embodiments. In addition, the size, spacing, and configuration of vertical spray arms 260, the number, position, and orientation of outer ports 262, and other features may vary while remaining within the scope of the present subject matter.

Figure 8:
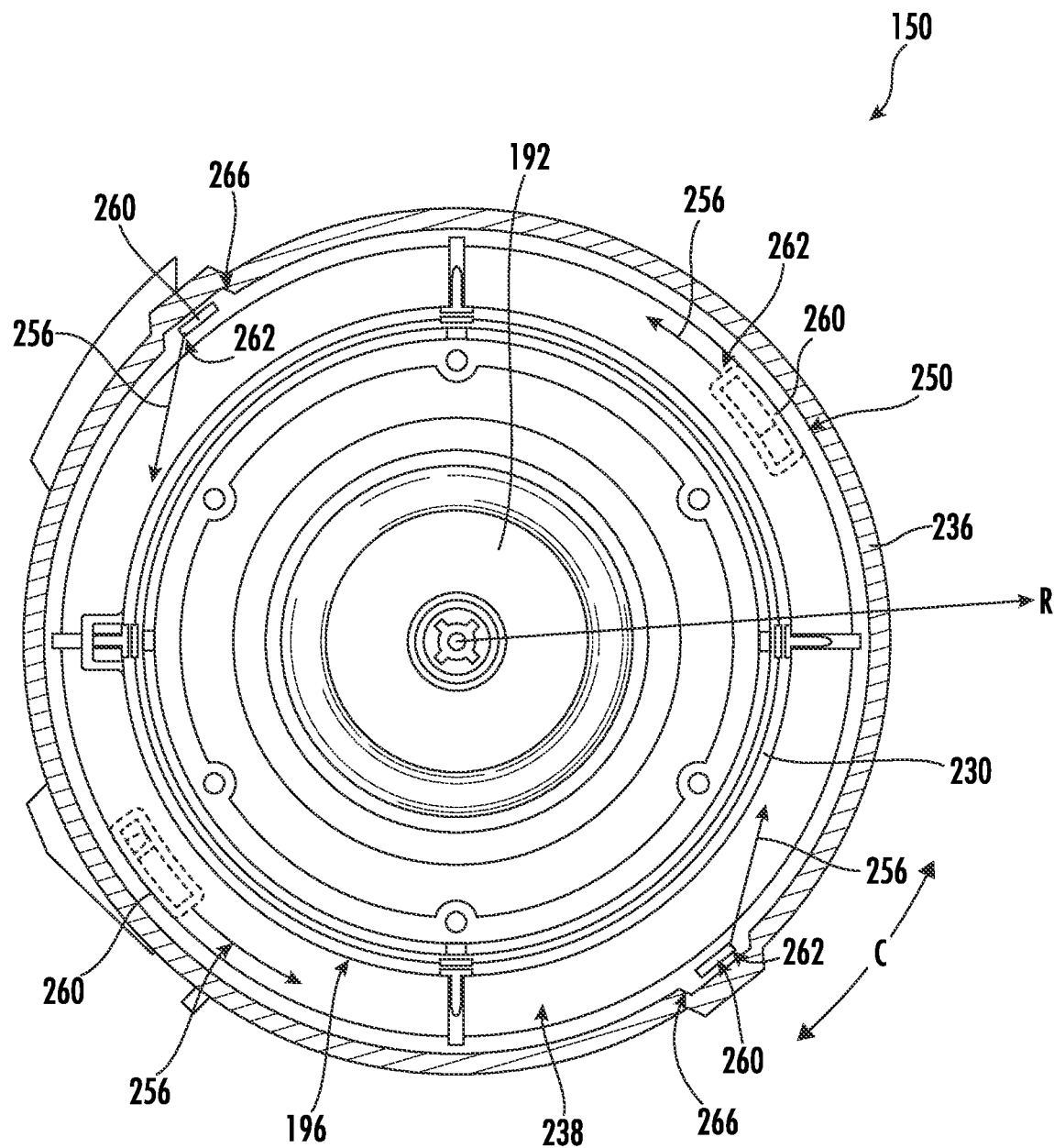
FIG. 8 provides a top view of the exemplary fluid circulation assembly of FIG. 3 according to an example embodiment of the present subject matter.

Referring now specifically to FIG. 8, two different variations of vertical spray arms 260 are illustrated. For example, two vertical spray arms 260 (illustrated in dotted lines) are positioned in the center of annular plenum 238 and direct the flow of wash fluid 256 directly along the circumferential direction C. However, according to an alternative embodiment illustrated in solid lines, vertical spray arms 260 may be partially recessed or embedded within cylindrical sump wall 236, e.g., to prevent flow restriction or blockage through annular plenum. In this regard, cylindrical sump wall 236 may define a recess 266 for receiving each of the vertical spray arms 260 such that the are fully recessed or protrude only partially into annular plenum 238. According to such an embodiment, the position and orientation of outer ports 262 may be varied to improve the flow of wash fluid 256 for filter cleaning purposes.

Figure 6:
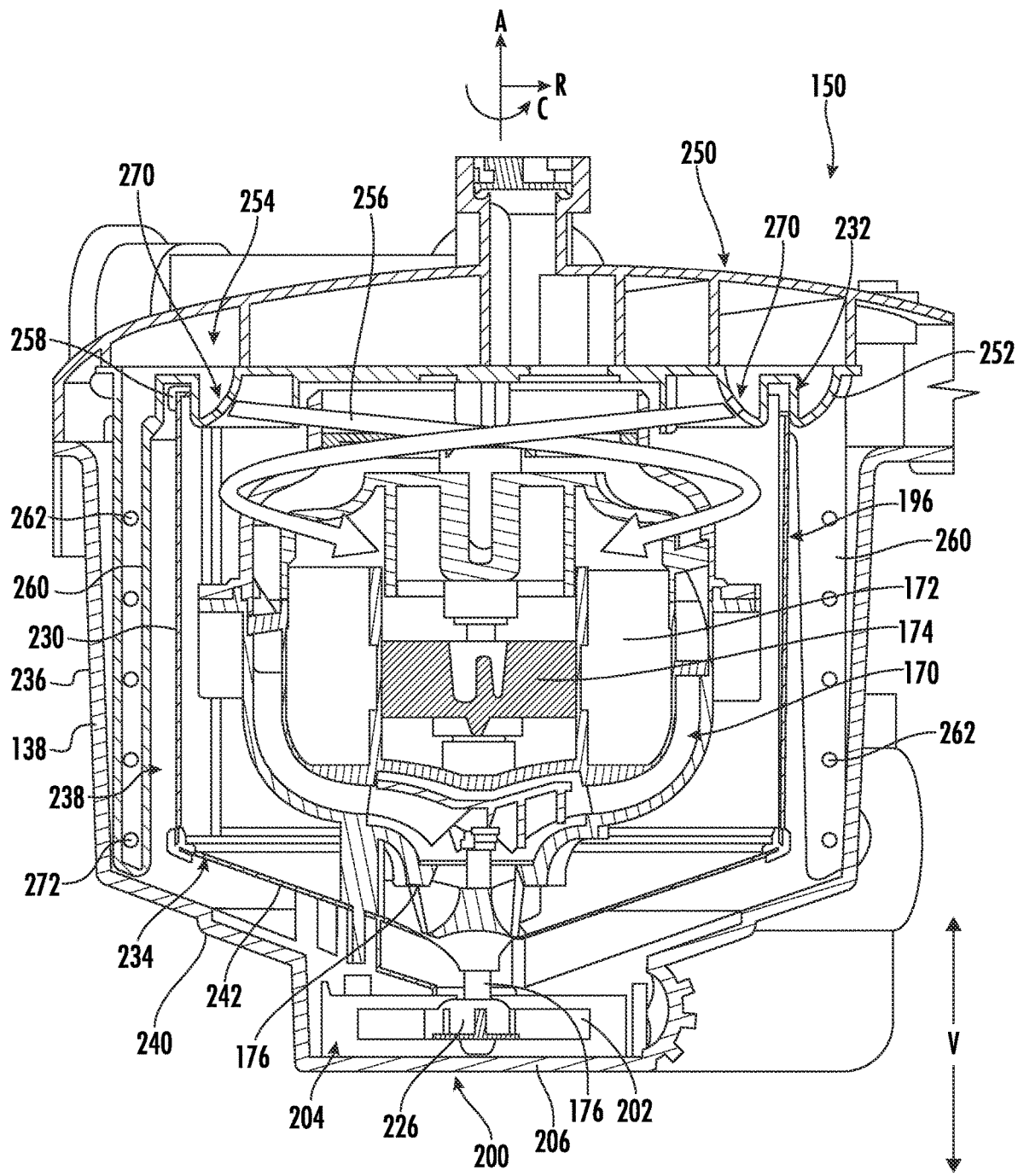
FIG. 6 provides a side, cross sectional view of the exemplary fluid circulation assembly of FIG. 3, emphasizing the operation of inner spray ports according to an example embodiment of the present subject matter.

Referring again generally to FIGS. 4 through 7, filter cleaning assembly 250 may include additional cleaning ports for improved agitation action and cleaning of filter screen 196. Specifically, as shown in FIG. 6, filter cleaning assembly 250 further includes a plurality of inner cleaning ports 270 defined in filter cleaning manifold 252 within filtered region 198 and being configured to circulate the wash fluid 256 within filtered region 198. In this regard, inner cleaning ports 270 may be defined at a top of filter region 198 and may be oriented downward and toward cylindrical screen 230. According to example embodiments, inner cleaning ports 270 may be positioned and oriented such that the exiting flow of wash fluid 256 may be at a similar or complementary angle to that discharge from outer ports 262. In this manner, the wash fluid 256 may agitate cylindrical filter screen 230 and provide a backflow that helps knock loose any debris fixed on the cylindrical filter screen 230.

Figure 7:
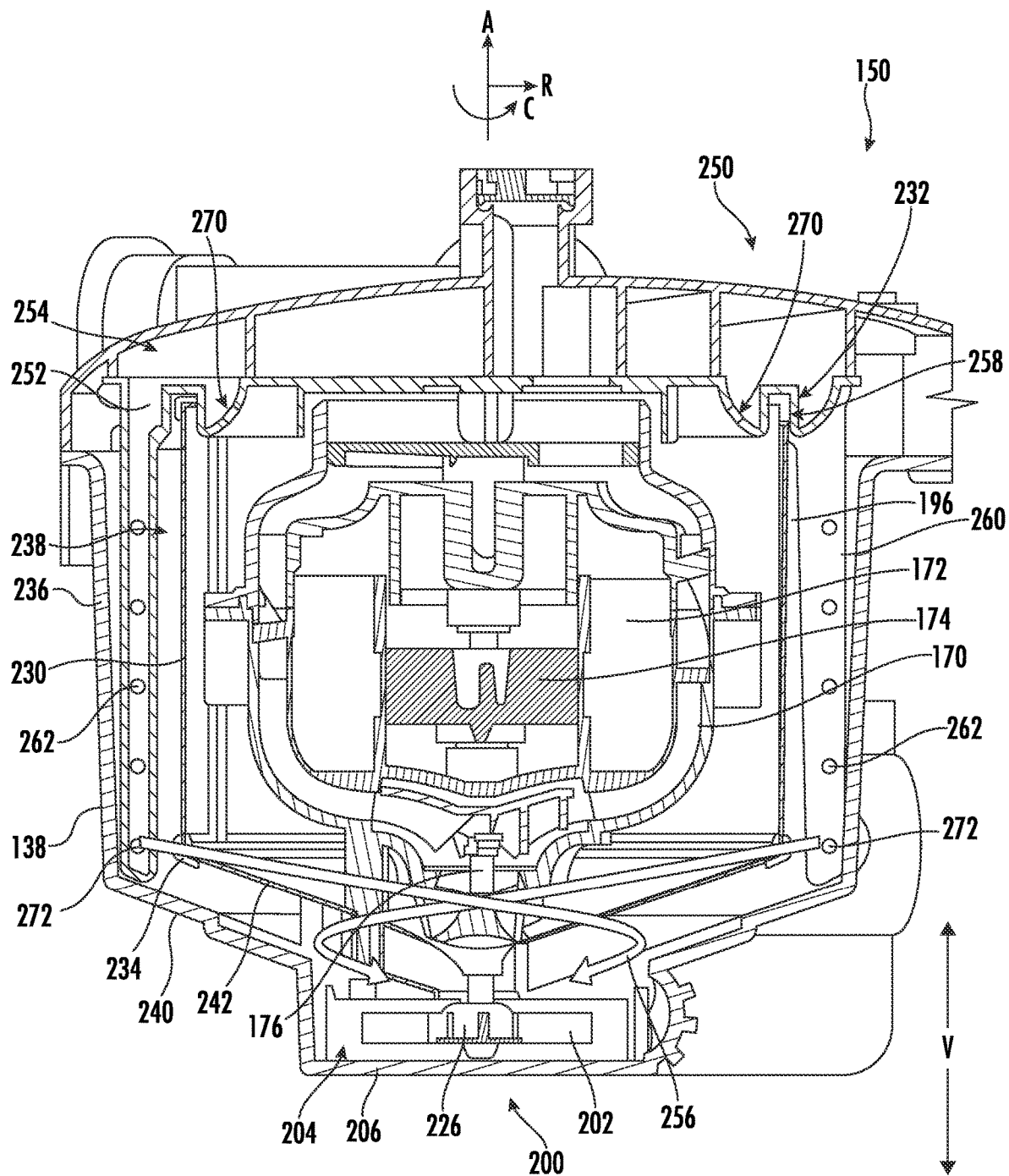
FIG. 7 provides a side, cross sectional view of the exemplary fluid circulation assembly of FIG. 3, emphasizing the operation of lower spray ports according to an example embodiment of the present subject matter.

Referring now specifically to FIG. 7, filter cleaning assembly 250 may further include a plurality of lower cleaning ports 272 defined in a distal end (e.g., the bottom) of the one or more vertical spray arms 260. These lower cleaning ports 272 may be positioned and oriented for cleaning conical filter screen 242. For example, these lower cleaning ports 272 may extend to or past the bottom end 234 of cylindrical filter screen 230. In addition, these lower cleaning ports 272 may be at the same or a different angle relative to outer ports 262. In addition, these portions may have any suitable size, shape, or spray pattern for improved cleaning.

During operation, when drive motor 170 is rotating in a wash direction, wash impeller 182 spins in a direction where it is designed to be most efficient in urging a flow of wash fluid through supply conduit 188. Notably, because drain pump impeller 202 is coupled to drive shaft 176 using a one-way clutch 226, drain pump assembly 200 pumps little or no wash fluid through discharge conduit 216 during the wash cycle.

It may be desirable to intermittently flush filter screen 196 during the wash cycle. To achieve such filter cleaning, controller 160 may be programmed to rotate diverter disc 192 to a filter cleaning position where an aperture defined in diverter disc 192 directs the flow of wash fluid from diverter chamber 194 into wash fluid plenum 254. The wash fluid is then distributed circumferentially throughout wash fluid plenum 254 and discharged out cleaning ports 262, 270, 272 along filter screen 196. This cleaning process may be repeated intermittently throughout a wash cycle, e.g., by alternating between providing wash fluid to the spray arm assemblies and the filter cleaning assembly 250. Alternatively, this cleaning process may be performed once at the end of a wash cycle, once at the beginning of a wash cycle, etc.

By contrast, when drive motor 170 reverses direction during a drain cycle, one-way clutch 226 engages driveshaft 176 such that drain pump impeller 202 begins discharging wash fluid through discharge conduit 216. Notably, during a drain cycle, wash pump impeller 182 also rotates with driveshaft 176 (e.g., because it is directly coupled to drive shaft 176). Because impellers have the tendency to pump fluid even when rotated in the reverse direction (albeit less efficiently), wash pump impeller 182 generates pressure within supply conduit 188 even during a drain cycle. To harness the pumping effect of the wash pump impeller 182 during a drain cycle, the diverter disk 192 may be rotated to provide fluid communication between diverter chamber 194 and wash fluid plenum 254 during a drain cycle. In this manner, as wash fluid is being discharged through discharge conduit 216 and level of wash fluid within sump 138 is dropping, filter cleaning assembly 250 flushes filter screen 196 with wash fluid until the wash fluid level drops below pump intake 186, at which time most or all food particles and soil have entered drain basin 206.

According to the illustrated embodiment, filter cleaning manifold 252 is positioned below the lower spray arm assembly 134 and at least partially within sump 138. Moreover, lower spray arm assembly 134 is connected to diverter assembly 200 using a different outlet defined on diverter chamber 194 than the outlet fluidly coupling diverter chamber 194 to wash fluid plenum 254. In this manner, lower spray arm assembly 134 and filter cleaning assembly 250 define two separate fluid circuits that may operate independently of each other. In this manner, when wash pump impeller 182 is pumping wash fluid, filter cleaning assembly 250 may utilize the full flow and pressure of wash fluid to clean filter screen 196. Thus, more effective cleaning may be achieved and a smaller drive motor 170 may be utilized than if wash pump impeller 182 were providing flow to both filter cleaning assembly 250 and lower spray arm assembly 134.

It should be appreciated that filter cleaning assembly 250 is described herein only for the purpose of explaining aspects of the present subject matter. Modifications and variations may be made to filter cleaning assembly 250 while remaining within the scope of the present subject matter. For example, the size, configuration, position, and orientation of cleaning ports 262, 270, 272 may vary. In addition, controller 160 may be programmed in any suitable manner for controlling drive motor 170 and diverter disc 192 to cleaning filter screen 196 at any suitable time and in any suitable manner. Thus, filter cleaning assembly 250 as described above provides a simple and effective means for cleaning filter screen 196 without requiring complicated plumbing systems or a larger drive motor or pump assembly. In addition, filter cleaning assembly 250 is generally more effective at cleaning filter screen 196 due to the proximity and angle of attack of cleaning ports 262, 270, 272. Moreover, energy usage may be reduced because a smaller drive motor 170 is needed and filter cleaning assembly 250 utilizes pumped wash fluid that would otherwise simply be recirculated in wash chamber to flush filter screen 196. Other configurations and benefits will be apparent to those of skill in the art.

As explained herein, aspects of the present subject matter are generally directed to a system for automatic suction-side filter cleaning in a dishwasher. This system may include a filter cleaning manifold that uses integrated jets to create a helical crossflow fluid pattern of wash fluid around and/or inside the filter to improve the dishwasher's ability to self-clean the suction-side of the filter. The filter cleaning manifold may be positioned above, outside and inside a filter assembly. Wash fluid from a circulation pump may be directed to a diverter (jet) that forces wash fluid into the filter cleaning manifold, where the manifold directs the wash fluid from the diverter outlet to the three (or more) sets of jets to perform filter cleaning.

For example, the cleaning jets may include outer radial jets, e.g., jets that create the helical crossflow of wash fluid across the outside surface while moving down toward the inlet of the circulation pump and hence displace the soil accumulated against the outside of the filter. In addition, these jets may include inner radial jets, e.g., jets that create the helical crossflow of wash fluid inside the filter chamber with the intended goal of creating reverse flow of wash fluid from the inside of the filter to the outside, assisted by the centrifugal forces of the rotating flow. In addition, these jets may include lower crossflow jets, e.g., jets that are designed to create crossflow of wash fluid on the lower portion of the filter assembly to displace soil accumulated against the outside surface of the filter. This system of cleaning filter improves the consumer experience by eliminating manual filter cleaning and improves the ability to utilize wash systems incompatible with manual clean filters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A dishwasher appliance defining a vertical direction, the dishwasher appliance comprising:
    a wash tub that defines a wash chamber;
    a sump for collecting wash fluid, wherein the sump is defined at least in part by a cylindrical outer sump wall, the cylindrical outer sump wall defining one or more recesses;
    a cylindrical filter screen positioned within the sump, the cylindrical filter screen defining a filtered region and an unfiltered region;
    a wash pump assembly comprising a wash pump impeller and a supply conduit, the wash pump impeller being configured for urging the wash fluid through the cylindrical filter screen and into the supply conduit; and
    a filter cleaning assembly comprising:
        a filter cleaning manifold positioned proximate the cylindrical filter screen and in fluid communication with the supply conduit; and
        one or more vertical spray arms extending along the vertical direction adjacent the cylindrical filter screen and being received within the one or more recesses of the cylindrical outer sump wall, the one or more vertical spray arms defining a plurality of outer ports in fluid communication with the filter cleaning manifold, the plurality of outer ports being positioned and oriented for directing the wash fluid at least partially along a circumferential direction about the cylindrical filter screen.

2. The dishwasher appliance of claim 1, wherein the one or more vertical spray arms comprise:
    a first spray arm and second spray arm spaced apart from each other about the circumferential direction.

3. The dishwasher appliance of claim 2, wherein the plurality of outer ports defined in the first spray arm and the plurality of outer ports defined in the second spray arm are oriented at an angle measured relative to the circumferential direction to create a helical flow around the cylindrical filter screen.

4. The dishwasher appliance of claim 1, wherein the one or more vertical spray arms extend along the vertical direction from a top end of the cylindrical filter screen to a bottom end of the cylindrical filter screen.

5. The dishwasher appliance of claim 1, wherein the cylindrical filter screen defines an outer radial surface through which the wash fluid is drawn into the filtered region, and wherein the one or more vertical spray arms are positioned within the unfiltered region adjacent to the outer radial surface.

6. The dishwasher appliance of claim 1, wherein the filter cleaning assembly further comprises:
    a plurality of inner cleaning ports defined in the filter cleaning manifold within the filtered region and being configured to circulate the wash fluid within the filtered region.

7. The dishwasher appliance of claim 6, wherein the plurality of inner cleaning ports is angled relative to a horizontal direction to create a helical flow around the cylindrical filter screen.

8. The dishwasher appliance of claim 1, further comprising:
    a conical filter screen positioned at a bottom end of the cylindrical filter screen, wherein the filter cleaning assembly further comprises:
    a plurality of lower cleaning ports defined in a distal end of the one or more vertical spray arms, the plurality of lower cleaning ports being positioned and oriented for directing the wash fluid onto the conical filter screen.

9. The dishwasher appliance of claim 1, wherein the filter cleaning manifold is positioned above the cylindrical filter screen and the one or more vertical spray arms along the vertical direction.

10. The dishwasher appliance of claim 1, wherein the filter cleaning manifold defines a filter receiving slot for receiving a top end of the cylindrical filter screen.

11. The dishwasher appliance of claim 1, wherein a motor, the wash pump impeller, and the supply conduit are positioned within the filtered region.

12. The dishwasher appliance of claim 1, further comprising a lower spray arm in fluid communication with the supply conduit, wherein the filter cleaning manifold is positioned below the lower spray arm.

13. A filter cleaning assembly for a dishwasher appliance, the dishwasher appliance comprising a cylindrical filter screen positioned within a sump and a wash pump assembly for urging wash fluid through a supply conduit, the filter cleaning assembly comprising:
    a filter cleaning manifold positioned proximate the cylindrical filter screen and in fluid communication with the supply conduit;
    one or more vertical spray arms extending along a vertical direction adjacent the cylindrical filter screen, the one or more vertical spray arms defining a plurality of outer ports in fluid communication with the filter cleaning manifold, the plurality of outer ports being positioned and oriented for directing the wash fluid at least partially along a circumferential direction about the cylindrical filter screen; and
    a plurality of inner cleaning ports defined in the filter cleaning manifold within a filtered region and being configured to circulate the wash fluid within the filtered region.

14. The filter cleaning assembly of claim 13, wherein the one or more vertical spray arms comprise:
   a first spray arm and second spray arm spaced apart from each other about the circumferential direction.

15. The filter cleaning assembly of claim 14, wherein the plurality of outer ports defined in the first spray arm and the plurality of outer ports defined in the second spray arm are oriented at an angle measured relative to the circumferential direction to create a helical flow around the cylindrical filter screen.

16. The filter cleaning assembly of claim 13, wherein the one or more vertical spray arms extend along the vertical direction from a top end of the cylindrical filter screen to a bottom end of the cylindrical filter screen.

17. The filter cleaning assembly of claim 13, wherein a conical filter screen is positioned at a bottom end of the cylindrical filter screen, the filter cleaning assembly further comprising:
   a plurality of lower cleaning ports defined in a distal end of the one or more vertical spray arms, the plurality of lower cleaning ports being positioned and oriented for directing the wash fluid onto the conical filter screen.

18. The dishwasher appliance of claim 13, wherein the filter cleaning manifold is positioned above the cylindrical filter screen and the one or more vertical spray arms along the vertical direction.

19. A dishwasher appliance defining a vertical direction, the dishwasher appliance comprising:
   a wash tub that defines a wash chamber;
   a sump for collecting wash fluid;
   a cylindrical filter screen positioned within the sump, the cylindrical filter screen defining a filtered region and an unfiltered region;
   a wash pump assembly comprising a wash pump impeller and a supply conduit, the wash pump impeller being configured for urging the wash fluid through the cylindrical filter screen and into the supply conduit; and
   a filter cleaning assembly comprising:
      a filter cleaning manifold positioned proximate the cylindrical filter screen and in fluid communication with the supply conduit;
      one or more vertical spray arms extending along the vertical direction adjacent the cylindrical filter screen, the one or more vertical spray arms defining a plurality of outer ports in fluid communication with the filter cleaning manifold, the plurality of outer ports being positioned and oriented for directing the wash fluid at least partially along a circumferential direction about the cylindrical filter screen; and
      a plurality of inner cleaning ports defined in the filter cleaning manifold within the filtered region and being configured to circulate the wash fluid within the filtered region.

20. The dishwasher appliance of claim 19, wherein the plurality of inner cleaning ports is angled relative to a horizontal direction to create a helical flow around the cylindrical filter screen.

* * * * *